(12) United States Patent
Klaas

(10) Patent No.: US 6,471,226 B1
(45) Date of Patent: *Oct. 29, 2002

(54) SWING ARM

(75) Inventor: Friedrich Klaas, Aalen (DE)

(73) Assignee: Gesellshaft fur Innenhochdruckverfahren mbH & Co. KG, Bopkingen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 09/381,198

(22) PCT Filed: Mar. 17, 1998

(86) PCT No.: PCT/DE98/00783

§ 371 (c)(1),
(2), (4) Date: Nov. 30, 1999

(87) PCT Pub. No.: WO98/41412

PCT Pub. Date: Sep. 24, 1998

(30) Foreign Application Priority Data

Mar. 17, 1997 (DE) ................................. 297 04 863 U

(51) Int. Cl.[7] .................................................. B60G 3/99
(52) U.S. Cl. ............................................... 280/128.134
(58) Field of Search ................. 280/124, 134, 280/128

(56) References Cited

U.S. PATENT DOCUMENTS

| | | | |
|---|---|---|---|
| 3,350,905 A | | 11/1967 | Ogura et al. .................... 72/28 |
| 4,556,234 A | * | 12/1985 | Mahnig et al. ............. 280/688 |
| 5,338,056 A | * | 8/1994 | Vrana et al. ................. 280/673 |
| 5,338,057 A | * | 8/1994 | Dickerson et al. .......... 280/675 |
| 5,544,907 A | * | 8/1996 | Lin et al. .................. 280/288.3 |
| 5,613,794 A | * | 3/1997 | Isaac et al. .................. 403/265 |
| 5,662,349 A | * | 9/1997 | Hasshi et al. ............... 280/690 |
| 5,695,213 A | * | 12/1997 | Nakamura et al. .......... 280/688 |
| 5,758,896 A | * | 6/1998 | Cruise ......................... 280/695 |
| 5,769,442 A | * | 6/1998 | Robinson et al. ........ 280/281.1 |
| 5,857,690 A | * | 1/1999 | Gueugneaud ............ 280/281.1 |
| 5,921,568 A | * | 7/1999 | Cruise et al. ......... 280/124.134 |
| 6,149,198 A | * | 11/2000 | Klaus .......................... 280/798 |
| 6,152,468 A | * | 11/2000 | Glaser et al. ......... 280/124.134 |

FOREIGN PATENT DOCUMENTS

| | | |
|---|---|---|
| DE | 43 22 632 | 1/1995 |
| DE | 44 42 150 | 5/1996 |
| DE | 195 06 160 | 8/1996 |
| EP | 742 057 | 11/1996 |
| EP | 758 565 | 2/1997 |
| GB | 2 291 382 | 1/1996 |
| WO | 94 04766 | 3/1994 |
| WO | 97 00595 | 1/1997 |

OTHER PUBLICATIONS

Patent Abstracts of Japan, vol. 013, No. 055, (M–795) Feb. 8, 1989, & JP 63 263115 A, Oct. 31, 1988.

* cited by examiner

Primary Examiner—Eric Culbreth
Assistant Examiner—L. Lum
(74) Attorney, Agent, or Firm—Pillsbury Winthrop LLP

(57) ABSTRACT

A swing arm for moveably fitting wheels onto a support element, comprising at least two hollow arm parts, hollow-moulded using the internal high pressure moulding method. One of the arm parts has a connecting projection which is inserted into and fixed in an end section of an other of said arm parts. An exterior peripheral surface of the projection corresponds to an interior peripheral surface of the end section of the other arm part so that the one arm part can be connected to the other arm part.

17 Claims, 2 Drawing Sheets

Fig. 1
Fig. 2
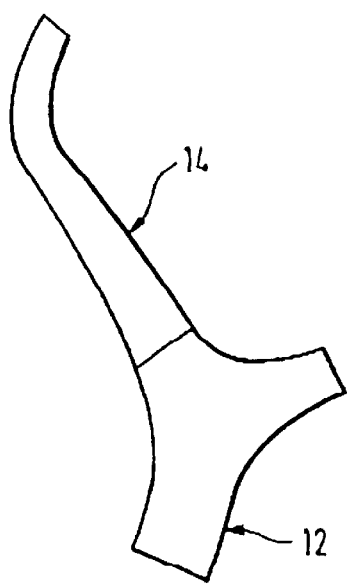
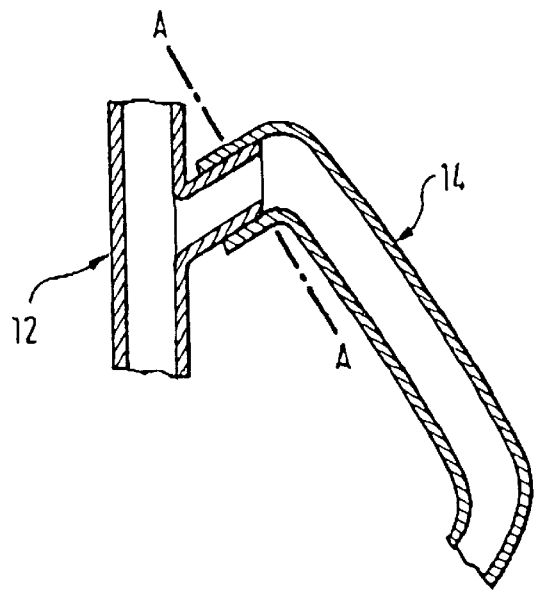

SWING ARM

BACKGROUND OF THE INVENTION

1. Field of the Invention

The invention relates to a swing arm for moveably fitting wheels onto a support element, especially for the suspension of single wheels in passenger cars, thus fitting the wheels to the body of the axle.

2. Description of Related Art

Swing arms are widely known. They were normally produced by using the hollow-shell construction method, according to which they were welded together from at least two metal sheets. Due to the welding seams, the hollow-shell construction method required a comparatively heavy weight of material. Furthermore, it was not possible to produce cross-sections that could optimally withstand the stress. These familiar swing arms required high production costs. This resulted in an undesirably heavy weight of such parts, especially if an increased load capacity was required. Ultimately, the welding seams were often the cause of rejects. A certain structural space was necessary due to the required load.

SUMMARY OF THE INVENTION

Therefore, it is the object of the invention to create a simpler and lighter swing arm.

The problem is solved, according to the invention, by a swing arm, having at least two hollow arm parts, hollow moulded, using the internal high pressure moulding method (IHM method) optionally with variable cross-sections. At least one of the arm parts has at least one connecting projection which is inserted into and fixed in the end section of the other arm. The exterior diameter of the projections corresponds to the interior cross-section of the other arm part, so that the connecting parts can be placed thereon.

It is advantageous if the arm parts are made, at least partially, of cold-deformable metal, metal alloy or plastic that can preferably be strain-hardened, and if they have a fibre flow that runs parallel to the outer contours of the arm parts.

The hollow moulded parts can, therefore, be made of a single material, for example, steel or a light-metal alloy. Depending on the realm of application, it is also possible to deform laminated material, as well as plastic-coated or coated pipes.

Depending on requirements, it is also possible to use variable materials for the different parts of the swing arm, according to the invention. When taking the swing arm apart in order to recyle the material, the parts can easily be separated again from one another.

It is advantageous if the swing arm is made, at least partially, of steel, for instance of carbon steel, such as ST 34 and ST 52, light metal, aluminum, magnesium, titanium or an alloy thereof, or of a fibre-reinforced material. For example, a naturally hard alloy or a cold-ageing alloy can be used as alumium alloy.

It may be practical for reinforcing purposes if the hollow arm parts have, at least partially, moulded sections, such as longitudinal or transverse ribs. Thus, a further savings of material can be realized.

To improve the torsional rigidity of the arm, it is appropriate for the cross-sections of the projections and also those of the connecting parts in the connecting area to be assummetrical and/or angular, for example, triangular, quadrangular, polygonal or oval in shape. However, they can also be round.

The wall thickness can basically be constant across the entire, respective part of the swing arm.

It is practical if a connecting section is moulded at least at one end of the hollow swing arm in order to simplify the attachment of the swing arm, for example, to the side member of a motor vehicle.

Due to the IHM method, it is possible to produce particularly light parts of small dimensions, thus requiring a smaller structural space, as compared to hollow shells.

It is especially preferred if the swing arm, according to the invention, is basically made of ST 34 or ST 52 steel of a wall thickness of about 1 to 5 mm, preferably ranging between 1.5 and 2.5 mm.

The individual parts of the swing arm, fitted into one another, can be fastened to one another by way of welding, bonding, riveting, soldering and through other connecting techniques familiar to the expert.

For example, the projections on the individual parts can be cut open, thus creating an open part. However, it is also possible to use projections that have not been cut open, and just slip on the arm part. This will result in a slightly increased weight but will additionally reinforce the connecting area and, furthermore, it will save one operational step (to cut open). Depending on the realm of application, the expert can select relevant measures.

The swing arm can be, for example, a front swing arm or a rear swing arm for a motor-vehicle axle or for landing gears, such as an aircraft landing gear.

Due to the fact that a swing arm has now been provided, which consists of at least two parts and is produced from internal high-pressure moulded parts, such swing arm can be created more easily whilst maintaining the same or having even better load characteristics than the familiar parts composed of individual shells. Furthermore, a savings in materials, as compared to the familiar parts, can be achieved. In addition, the swing arm can be optimally adapted to the required structural space.

It is appropriate to cold-form such parts by way of the internal high-pressure moulding method. Cold deformation, according to the internal high-pressure moulding method, will result in strain-hardening, which provides the element with especially advantageous strength properties. In addition, cold-forming processes are energetically advantageous.

The internal high-pressure method as such is well known. By internal high-pressure method, also called the IHM method, is meant here the method which was described, for example, in Industrial Gazette No. 20 of Mar. 9, 1984, and also in "Metal Deformation Technique", Issue 1D/91, Page 15 and following pages: A. Ebbinghaus: Precision Workpieces of Light-Weight Construction produced through Internal High-Pressure Deformation", or also in "Material and Operation", 123 to 243: A. Ebbinghaus: "Economic Construction with Precision Workpieces produced by way of Internal High-Pressure Deformation", and also in "Material and Operation" 122, (1991), 11 (1989) Pages 933 to 938. To avoid repetition, reference to the disclosure thereof is made hereinafter to the full extent. This method has been applied up to now to produce various moulded, hollow parts, for example, to produce built-up camshafts for attaching cams to a pipe, to produce hollow camshafts, space steering control shafts, but also motor vehicle frame components.

Owing to the internal high-pressure method, it is possible to produce hollow, metallic, structural elements, which are completely new, wherein the fibre flow of the walls runs basically parallel to the outer contour and where there is no buckling or other weakening. Due to the great wall strength resulting from the advantageous fibre flow, the hollow structural elements can, therefore, be constructed parallel to the outer contours, and strain hardening can be achieved in a lighter form than has been the case up to now, thus rendering a substantial savings in weight possible. It is also possible to use laminated materials for the mould, provided these can be deformed jointly. By selecting suitable materials, laminates can be lighter than solid materials, and have the additional advantage of absorbing vibration, or they can have other coatings on the the surfaces, according to the ambient stress (corrosion due to acids, etc.), so that such a part has, in addition, also advantageous damping characteristics which in the case at hand may be very desirable.

By having the material follow along the longitudinal axis of the pipe during the deformation, for example, by way of movable mould elements, it is possible to achieve a basically uniform wall thickness in the formed part—also when tip-stretching connecting elements—so that a weakening of the wall thickness, due to the tip-stretching of projections, can be at least partially balanced and this can be achieved without weakening.

The swing arm, according to the invention, can be used—naturally, with correspondingly adapted dimensions and possibly also materials—in vehicles of any kind in order to ensure a flexible and vibration-damping suspension of single wheels.

It is possible that the material of the swing arm is multilayered, in which case the layers can be of the same or of variable material, which may be metallic or also non-metallic, plastic or ceramic. Depending on the material selected, an adaptation to respective realms of application is possible. For example, a metal part can be produced in a way in which it is corrosion resistant, or it can also be produced with "material-specific" vibration damping.

It can be advantageous if the outer formed part has several mating layers running parallel to one another, which are made of the same or of different materials whose fibres run parallel to one another.

The entire structural part can basically consist of the same or of various light metals, especially for the purpose of weight savings. The light metal, for example, can be aluminum or an alloy therof, which could be corrosion resistant as an advantageous characteristic.

According to an advantageous method for producing hollow, moulded parts, a hollow, outer mould is produced in the customary manner by drawing, casting, extruding or by internal high-pressure moulding, which is subsequently finished by applying the familiar internal high-pressure method.

Depending on the demands made on the material, also multilayered metal pipes can be chosen as starting parts. Multilayered designs have the advantage that the surfaces of the hollow part are subjected to variable stress and that vibrations of any kind are more difficult to guide, which in turn decisively improves the vibration characteristic of the hollow part when used. The internal high-presure method makes it possible to produce already in one moulding process, projections, depressions, openings, etc. on the outer hollow part.

Variable hollow sections, such as rectangular sections, angular sections, pipes, etc. wherein the cross-sectional form can vary across the course of the part, can be used as arm parts.

Thus, a part is created which, compared to previous parts, weighs less and occupies less structural space, whilst the load capacity is the same or whilst the stressability is higher at a lower weight and which, in addition, can be manufactured at high production accuracy with a reduced scrap percentage rate.

BRIEF DESCRIPTION OF THE DRAWINGS

The invention is explained below in greater detail, based on the attached drawings which show the following:

FIG. 1 is a schematic representation of a construction form of the swing, according to invention, shown in plan view.

FIG. 2 is a subsection of the swing arm, according to FIG. 1, shown in longitudinal section.

DETAILED DESCRIPTION OF ILLUSTRATED EMBODIMENTS

Figure 3:
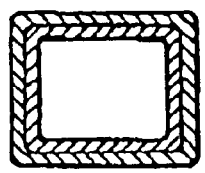
FIG. 3 is a subsection of the swing arm, shown in cross-section along line A—A of FIG. 2.

As can be ascertained from FIGS. 1, 2 and 3, which show the same structural part in perspective, as well as parts thereof, in longitudinal and in cross-section, respectively, the swing arm, according to the invention, is made of a steel pipe, as a preferred form of construction. The steel pipe was formed tridimensionally in this case by applying the internal high-pressure method. The pipe may be any elongated hollow body and does not have to be round in cross-section.

The end of the arm part (14) is placed on the arm part (12), which has a moulded projection, and then fastened to the arm part (12). The projection, which is produced as a closed protuberance by way of the internal high-pressure method, was cut open prior to attaching the arm part (14), and the cut-off section was removed.

It should be noted that in parts,—the arms of the swing arm—produced by way of the deformation method, purposely moulded grooves/depressions can be constructed in certain areas of the pipe in order to reinforce the element at certain points later on so they they can withstand stress better at such points.

The hollow sections of the structural element can vary in diameter along their lengths, as well as in cross-section.

Figure 4:
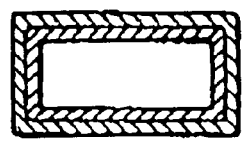
FIG. 4 shows another form of construction of a swing arm in cross-section along line A—A of FIG. 2.

FIG. 4 shows another form of application of an element, according to the invention. It concerns in this case an arm with an angular cross-section in order to make the connecting seam among the parts more secure against torsion in the end section of the arm and in the projection.

Figure 5:
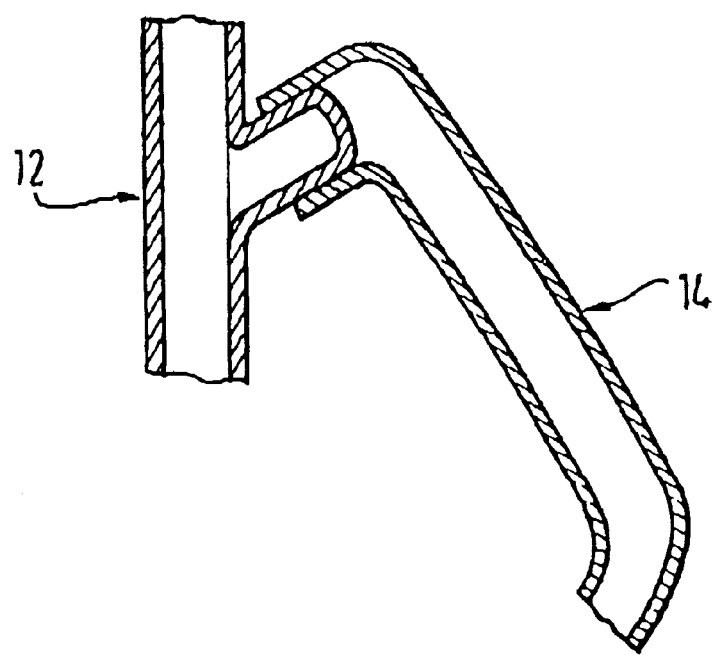
FIG. 5 is another form of construction of a swing arm, according to the invention, shown in longitudinal section.

FIG. 5 shows an arm in which the projection, produced by way of the internal high-pressure method, was not cut off, and the arm part (14) was directly placed on the closed projection and fixed thereon without necssitating the preceding operational step of cutting off the end of the projection.

Due to the geometric design of the swing arm, it is possible, according to the invention, to achieve the desired behaviour by using considerably lighter and simpler swing arms than those which have been possible to be produced up to now.

Other forms of construction and further developments will be obvious to the expert within the protective scope of the claims. The scope of protection is in no way limited to the specific embodiments cited by way of example here, because they are intended for explanatory purposes only.

What is claimed is:

1. A swing arm for moveably fitting wheels onto a support element, comprising at least two hollow arm parts, hollow-moulded using an internal high-pressure moulding method (IHM method), and in which one of said arm parts has a connecting projection which is inserted into and fixed in an end section of an other of said arm parts, wherein an exterior peripheral surface of the projection corresponds to an interior peripheral surface of the end section of the other arm part, so that the one arm part can be connected to the other arm part.

2. A swing arm, according to claim 1, wherein the projection is produced as a closed protuberance by means of the internal high-pressure moulding method, and wherein the projection is cut open prior to connection with the other arm part.

3. A swing arm, according to claim 1, wherein the arm parts are constructed, at least partially, of one of cold-formable metal, metal alloy, and plastic, which can preferably be strain-hardened.

4. A swing arm, according to claim 1, wherein the arm parts consist of various materials.

5. A swing arm, according to claim 1, wherein the arm parts are constructed, at least partially, of at least one of carbon steel, light metal, and fiber-reinforced material.

6. A swing arm, according to claim 5, wherein the arm parts are constructed of light metal and wherein the light metal is an aluminum alloy that is one of a naturally hard alloy and a cold-aging alloy.

7. A swing arm, according to claim 1, wherein the arm parts are constructed, at least partially, of a fibre-reinforced material.

8. A swing arm, according to claim 1, wherein the arm parts have at least one of longitudinal and transverse ribs.

9. A swing arm, according to claim 1, wherein the peripheral surfaces of the projection and the end section of the other arm part have at least one of an assymetrical and angular shape.

10. A swing arm, according to claim 1, wherein a wall thickness of the entire swing arm is substantially constant.

11. A swing arm, according to claim 1, wherein the arm parts are constructed of one of ST 34 and ST 52 steel and having a wall thickness between 1 and 5 mm.

12. A swing arm, according to claim 11, wherein the wall thickness is between 1.5 and 2.5 mm.

13. A swing arm, according to claim 1, wherein the one arm part and the other arm part are connected to one another by one of welding, bonding, riveting, and soldering.

14. A swing arm, according to claim 1, wherein the swing arm is at least one of a front swing arm and a rear swing arm for a motor-vehicle axle.

15. A swing arm according to claim 1, wherein said arm parts have variable cross-sections.

16. A swing arm, according to claim 1, wherein the arm parts consist of various material strengths.

17. A swing arm, according to claim 1, wherein the swing arm is at least one of a front swing arm and a rear swing arm for aircraft landing gear.

* * * * *

UNITED STATES PATENT AND TRADEMARK OFFICE
CERTIFICATE OF CORRECTION

PATENT NO.     : 6,471,226 B1
DATED          : October 29, 2002
INVENTOR(S)    : Klaas It is certified that error appears in the above-identified patent and that said Letters Patent is hereby corrected as shown below:

<u>Title page,</u>
Item [73], please amend the name of the Assignee to read as follows:
-- [73] Assignee: Gesselshaft fur Innenhochdruckverfahren mbH & Co. KG, Bopfingen (DE) --

Signed and Sealed this

Twenty-ninth Day of July, 2003

JAMES E. ROGAN
*Director of the United States Patent and Trademark Office*